United States Patent [19]

Nishino

[11] Patent Number: 5,222,126
[45] Date of Patent: Jun. 22, 1993

[54] COMMUNICATION APPARATUS CONNECTED TO OTHER COMMUNICATION TERMINALS

[75] Inventor: Tsutomu Nishino, Yokohama, Japan

[73] Assignee: Canon Kabushiki Kaisha, Tokyo, Japan

[21] Appl. No.: 270,208

[22] Filed: Nov. 14, 1988

[30] Foreign Application Priority Data

Nov. 16, 1987 [JP] Japan .................................. 62-289151
May 11, 1988 [JP] Japan .................................. 63-115775

[51] Int. Cl.[5] ........................ H04M 11/00; H04N 1/32
[52] U.S. Cl. .................................. 379/100; 379/157; 379/165
[58] Field of Search .................. 379/93, 96, 97, 98, 379/100, 94, 157, 212, 165, 214, 84, 70, 201, 161; 358/257

[56] References Cited

U.S. PATENT DOCUMENTS

| | | |
|---|---|---|
| 4,086,443 | 4/1978 | Gorham et al. |
| 4,353,097 | 10/1982 | Takeda et al. |
| 4,524,244 | 6/1985 | Faggin et al. |
| 4,535,199 | 8/1985 | Zink ........................................ 379/94 |
| 4,564,724 | 1/1986 | Nakayama et al. ................. 379/100 |
| 4,640,989 | 2/1987 | Riner et al. ............................ 379/96 |
| 4,677,660 | 6/1987 | Yoshida ................................ 379/100 |
| 4,763,354 | 8/1988 | Fukushima et al. ................ 379/165 |
| 4,773,080 | 9/1988 | Nakajima et al. ............. 379/100 X |
| 4,794,637 | 12/1988 | Hashimoto .......................... 379/100 |
| 4,800,439 | 1/1989 | Yoshino ....................... 379/100 X |
| 4,805,210 | 2/1989 | Griffith, Jr. ......................... 379/161 |
| 4,815,121 | 3/1989 | Yoshida ....................... 379/100 X |
| 4,825,461 | 4/1989 | Kurita et al. .......................... 379/93 |
| 4,850,008 | 7/1989 | Berg et al. ............................ 379/93 |
| 4,856,049 | 8/1989 | Streck .......................... 379/100 X |
| 4,879,741 | 11/1989 | Liu ........................................ 379/100 |
| 4,881,129 | 11/1989 | Mitsuhashi .......................... 379/100 |

FOREIGN PATENT DOCUMENTS

| | | |
|---|---|---|
| 0141911 | 5/1985 | European Pat. Off. |
| 0249205 | 12/1987 | European Pat. Off. |
| 60-214676 | 10/1985 | Japan . |
| 2166624 | 5/1986 | Japan .................................. 379/100 |
| 62-16595 | 4/1987 | Japan . |
| 63-33961 | 2/1988 | Japan .................................. 379/100 |
| 63-74364 | 4/1988 | Japan .................................. 379/100 |
| 0151166 | 6/1988 | Japan .................................. 379/100 |
| 63-174464 | 7/1988 | Japan .................................. 379/100 |
| 0190464 | 8/1988 | Japan .................................. 379/165 |
| 0135287 | 5/1989 | Japan .................................. 379/100 |
| WO/88/02206 | 3/1988 | PCT Int'l Appl. ................... 379/96 |
| 2105950 | 3/1983 | United Kingdom . |
| 2156187 | 10/1985 | United Kingdom . |
| 2169172 | 7/1986 | United Kingdom . |
| 2172473 | 9/1986 | United Kingdom . |

OTHER PUBLICATIONS

Fike and Friend, *Understanding Telephone Electronics* Copyright 1983 p. 54.

*Basic Telephone Switching Systems*, Feb. 13, 1980 David Talley, p. 82.

Primary Examiner—James L. Dwyer
Assistant Examiner—Wing F. Chan
Attorney, Agent, or Firm—Fitzpatrick, Cella, Harper & Scinto

[57] ABSTRACT

A communicating system has a control unit to perform a switching control of lines, a communicating apparatus which is connected to the control unit and operates in accordance with the control by the control unit and another terminal such as a facsimile apparatus connected to the communicating apparatus, wherein the communicating apparatus has connecting apparatus to connect this terminal with the control unit independently of the control by the control unit. The communicating apparatus consists of a button telephone set connected to the control unit by a communicating line and a control line. With this system, the switching operation can be performed without needing a complicated control and the connecting lines such as speech lines and control lines can be efficiently used. The user can arbitrarily switch the line of the communicating apparatus to which the facsimile apparatus is connected.

79 Claims, 6 Drawing Sheets

COMMUNICATION APPARATUS CONNECTED TO OTHER COMMUNICATION TERMINALS

BACKGROUND OF THE INVENTION

1. Field of the Invention

The present invention relates to a communication apparatus to which other communication terminals can be connected.

2. Related Background Art

In Japanese Patent Publication No. 62-16595 or the like, there has been disclosed a button telephone system in which an existing other terminal such as a facsimile apparatus or the like is connected to a button telephone set which transmits and receives a speech signal and a data signal to and from an exchange through different lines. According to the system of Japanese Patent Publication No. 62-16595, the exchange transmits a connection request to the facsimile apparatus to the button telephone set to which the facsimile apparatus is connected.

However, in the above conventional system (Japanese Patent Publication No. 62-16595), when a speech signal line is switched from the button telephone set to the other existing terminal (facsimile apparatus), the speech line is switched to the terminal side by a control circuit of the button telephone set which received a data signal from the exchange side. Therefore, the exchange side must detect whether a distant side to be connected to the button telephone system is a telephone set or a facsimile terminal. Further, when the distant side to be connected to the button telephone system has been determined to be a facsimile apparatus, a control circuit, a control program, and the like to transmit switching instruction data of a communication signal line to the button telephone set are needed. As mentioned above, the system of Japanese Patent Publication No. 62-16595 has a problem in that the control means on the exchange side becomes complicated and increases.

Further, in the conventional system, since an instruction to switch is performed on the exchange side, there is a problem in the operation in that the operator cannot manually switch the speech line to the terminal side at an arbitrary time point.

On the other hand, in a conventional button telephone system having a facsimile apparatus therein, when the facsimile apparatus is enclosed in the extension, by assigning the facsimile apparatus to one line of the extension and by providing special control means in a main unit, the facsimile apparatus is enclosed in the extension. Or, control means only for use of the facsimile apparatus is provided to the outside of the main unit by an adapter type or the like, thereby enclosing the facsimile apparatus to the extension. In these button telephone systems, the special control means detects and controls an originating call request, a dial signal, etc. from the facsimile apparatus, thereby enabling the facsimile apparatus to execute a predetermined communication.

In the conventional button telephone systems mentioned above, there is a problem in that a special extension needs to be assigned to one line in order to enclose the facsimile apparatus or the like and the button telephone set cannot be connected to the extension nor used.

Further, in the case of the construction in which special control means is provided in the main unit, there is a problem in that the control means of the main unit becomes complicated and increases.

Or, in the case of providing the control means of the adapter type to the outside of the main unit, there are problems such that an installing space of the adapter is needed and the manufacturing cost rises due to a casing for an adapter or the like.

SUMMARY OF THE INVENTION

It is an object of the present invention to provide a communication system which can operate without requiring complicated controls.

Another object of the invention is to provide a communication apparatus having an excellent operability.

Still another object of the invention is to provide a button telephone system which can efficiently use connecting lines.

Still another object of the invention is to provide a communication system in which a user can arbitrarily switch the lines of a communication apparatus to which another terminal is connected.

Still another object of the invention is to improve a communication apparatus in consideration of the foregoing problems.

The above and other objects and features of the present invention will become apparent from the following detailed description and the appended claims with reference to the accompanying drawings.

DESCRIPTION OF THE PREFERRED EMBODIMENT

Figure 1:
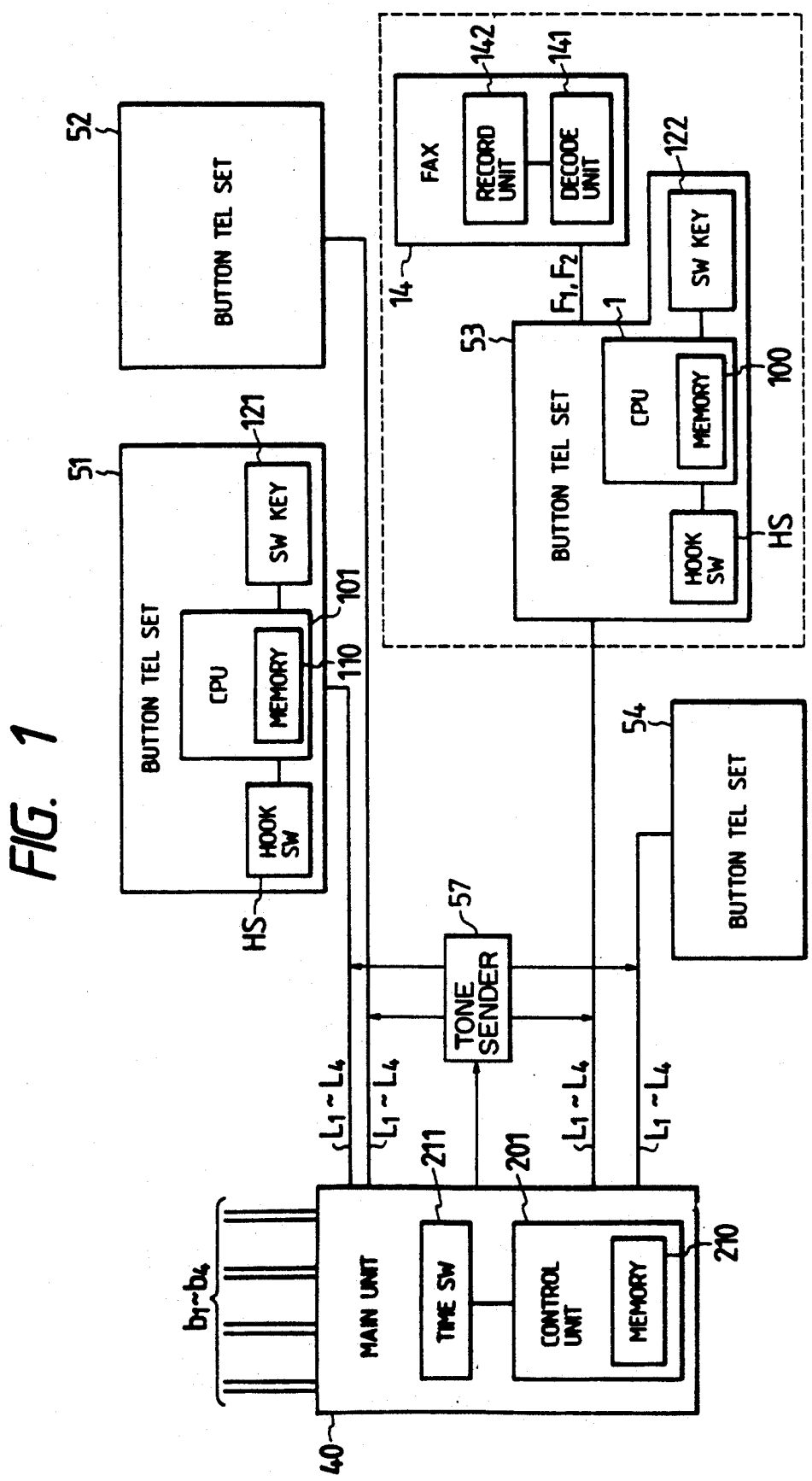
FIG. 1 is a block diagram showing an arrangement of a button telephone system in which the present invention is embodied.

FIG. 1 shows a system arrangement diagram of a button telephone system to which the present invention is embodied.

Reference numeral 40 denotes a main unit which is connected to a central telephone exchange or the like by telephone lines (hereinafter, referred to as line wires) $b_1$ to $b_4$ each consisting of two lines. By controlling a time switch 211, a control unit 201 of the main unit 40 controls the exchange, reservation, transfer, and the like of the line wires $b_1$ to $b_4$ and extensions $L_1$ to $L_4$. The control unit 201 controls the time switch 211 in accordance with programs which have previously been registered in a memory 210.

Reference numerals 51 to 54 denote button telephone sets connected to the main unit 40 by the extensions consisting of four lines $L_1$ to $L_4$. A CPU 101 of the button telephone set 51 executes the transmission, termination, speech, reservation, transfer, disconnection, etc. in accordance with programs stored in a memory 110. HS denotes a hook switch and reference numeral 121 denotes a switching key to request the transfer to a facsimile apparatus 14. Constructions of the button telephone sets 52 and 54 are common to that of the button telephone set 51.

The button telephone set 53 is connected to the facsimile apparatus 14 by the extensions consisting of two lines $F_1$ and $F_2$. A switching key 22 is provided to request the transfer from the button telephone set 53 to the facsimile apparatus 14.

In the facsimile apparatus 14, the image signal received from the extensions $F_1$ and $F_2$ is decoded by a decoding unit 141 and the decoded image signal is output onto a recording paper by a recording unit 142.

The operation of the embodiment will now be schematically explained hereinbelow.

When the control unit 201 of the main unit 40 detects a terminating call from the line wire $b_1$, the control unit 201 transmits a bell sound (calling instruction) to all of the connected button telephone sets 51 to 54, thereby allowing these telephone sets to ring.

At this time, if the operator off-hooks the hand-set of the button telephone set 53, the following operations are executed.

That is, when a CPU 1 of the button telephone set 53 detects the off-hook of the handset by the hook switch HS, the CPU 1 sends an off-hook signal (connection request) to the control unit 201 of the main unit 40 by the control lines $L_3$ and $L_4$ among the extensions $L_1$ to $L_4$. When the control unit 201 receives the off-hook signal, it finishes the transmission of the bell sound. Then, the line wire $b_1$ is captured and the speech paths between the line wire $b_1$ and the speech lines $L_1$ and $L_2$ among the extensions $L_1$ to $L_4$ of the button telephone set 53 are connected, thereby setting the line wire $b_1$ and the button telephone set 53 into the speech mode. If the distant side by the line wire $b_1$ is the facsimile apparatus, a beep sound is transmitted from the facsimile apparatus on the line wire distant side. When the operator of the button telephone set 53 confirms the beep sound from the speech unit of the handset, he depresses a line switching key 22 of the button telephone set 53. When the CPU 1 of the button telephone set 53 detects the depression of the switching key 22, the speech lines $L_1$ and $L_2$ and the speech lines $F_1$ and $F_2$ are connected. That is, the facsimile apparatus 14 is connected to the line wire $b_1$ through the communication lines $L_1$ and $L_2$. The facsimile apparatus 14 decodes the signal transmitted from the line wire $b_1$ by the decoding unit 141 and records the decoded signal as an image onto the recording paper by the recording unit 142.

The above operations relate to the case in the manual switching mode in which the line is manually switched. An explanation will now be made with regard to the case of the automatic switching mode in which the button telephone set 53 automatically switches.

In this case as well, when a terminating call is received from the line wire $b_1$, the control unit 201 of the main unit 40 detects it and transmits the bell sound (calling instruction) to all of the button telephone sets 51 to 54.

Upon detection of the calling instruction, the CPU 1 of the button telephone set 53 automatically requests the connection with the line wire $b_1$ to the control unit 201 of the main unit 40 through the control lines $L_1$ and $L_2$ without waiting for the request for connection of the operator by the off-hook. On the other hand, the speech lines $L_1$ and $L_2$ and the speech lines $F_1$ and $F_2$ are automatically connected without waiting for the switching request of the operator by the switching key 22. Thereafter, in a manner similar to the case of the manual switching, the facsimile apparatus 14 records the image by the recording unit 142 on the basis of the image signal received from the line wire $b_1$.

The above operations relate to the case where a response signal is returned to the facsimile apparatus of the line wire from the button telephone set 53 to which the facsimile apparatus 14 is connected. An explanation will now be made with respect to the case where the off-hook is performed by the button telephone set 51 to which no facsimile apparatus is connected for an originating call from the facsimile apparatus of the line wire.

That is, when the control unit 201 of the main unit 40 detects a terminating call from the line wire $b_1$, the control unit 201 transmits the bell sound (calling instruction) to all of the button telephone sets 51 to 54. Therefore, even when the terminating call is sent from the facsimile apparatus, there is a case where the operator off-hooks the handset of the button telephone set 51 to which no facsimile apparatus is connected.

In this case as well, when the off-hook is detected by the hook switch HS, the control unit CPU 101 of the button telephone set 51 sends an off-hook signal (connection request) to the control unit 201 of the main unit 40 through the control lines $L_3$ and $L_4$. Upon reception of the off-hook signal, the control unit 201 connects the line wire $b_1$ to the button telephone set 51. Then, the facsimile apparatus of the line wire sends the beep sound. When the beep sound is confirmed from the speech unit of the handset, the operator of the button telephone set 51 depresses the switching key 121 of the button telephone set 51. Upon detection of the depression of the switching key 121, the CPU 101 of the button telephone set 51 outputs a transfer request to the control unit 201 of the main unit 40 by the control lines $L_3$ and $L_4$. When the transfer request from the CPU 101 is detected, the control unit 201 reads out the extension number of the button telephone set 53 to which the facsimile apparatus is connected and which has previously been registered in the memory 210. The control unit 201 outputs a facsimile switching instruction to the button telephone set 53 by the control lines $L_3$ and $L_4$ and disconnects from the button telephone set 51.

When the facsimile switching instruction is received from the control lines $L_3$ and $L_4$, the CPU 1 of the button telephone set automatically connects the speech lines $L_1$ and $L_2$ with the speech lines $F_1$ and $F_2$ irrespective of the manual switching mode or automatic switching mode. After that, the facsimile apparatus 14 records the image signal by the recording unit 142 as mentioned above.

In this manner, by previously registering the extension number of the button telephone set 53 to which the facsimile apparatus is connected into the memory 210, when transferring from another button telephone set to the button telephone set 53, the transferring operation can be quickly performed by a single touch of the switching key without inputting the extension number. On the other hand, since the extension number is registered in the memory 210 of the main unit, it can be easily registered as compared with the case of registering the extension number in each button telephone set.

On the other hand, when a plurality of facsimile apparatuses can be connected, the extension numbers of the button telephone sets to which the facsimile apparatuses are connected are registered into the memory 210 and as many switching keys as facsimile apparatuses are provided for the button telephone sets. In this case, an image signal can be transferred to a desired plurality of facsimile apparatuses.

The construction and operation of the button telephone set 53 shown in FIG. 1 will now be described further in detail with reference to FIGS. 2 to 4.

Figure 2:
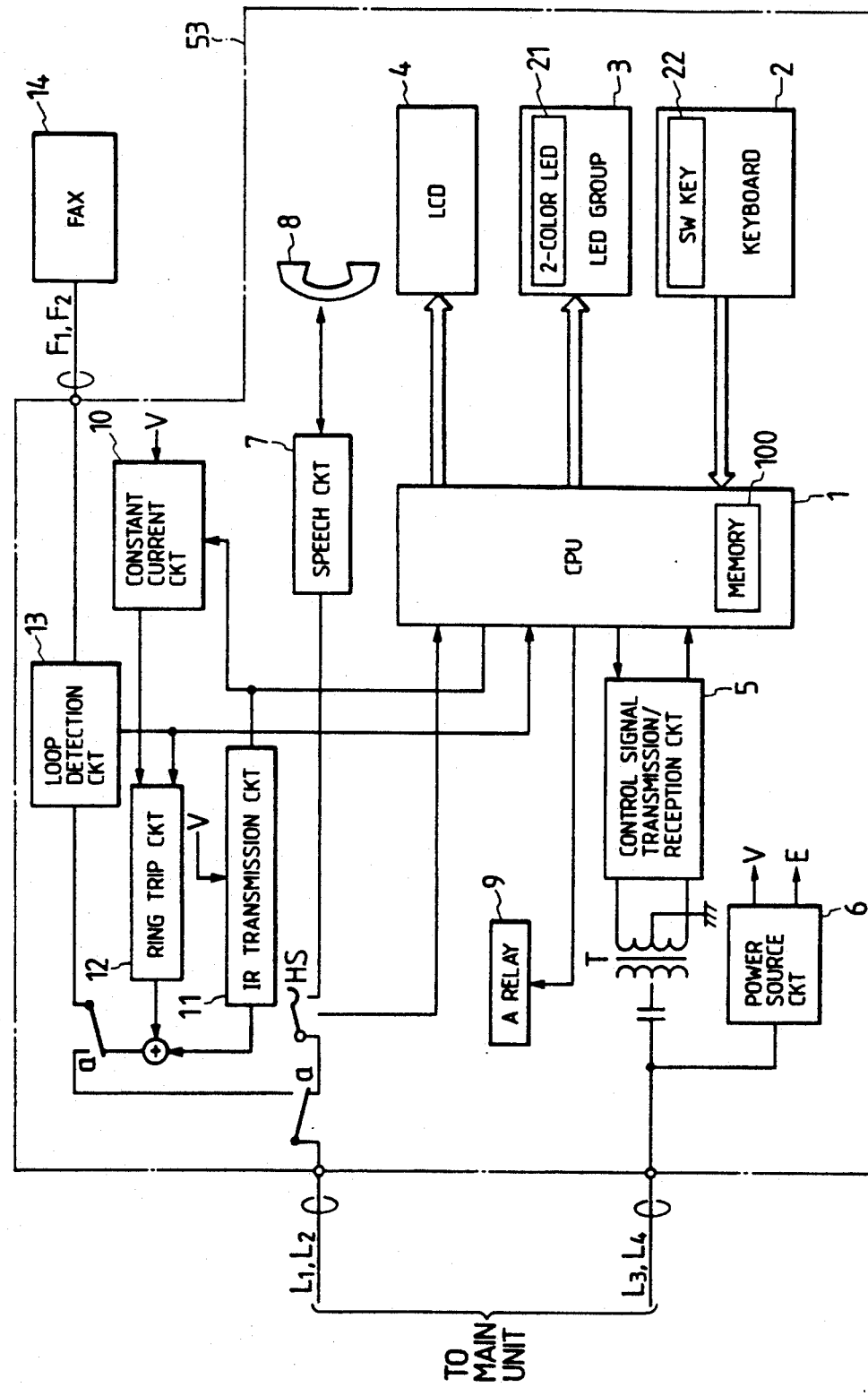
FIG. 2 is a block diagram showing an arrangement which is needed at a terminating call of a button telephone set in an embodiment.

FIG. 2 is a block diagram showing an arrangement of the main section of the button telephone set in the embodiment. In the diagram, $L_1$ and $L_2$ denote the speech lines. The button telephone set 53 performs the transmission and reception of the speech signal with the main unit 40 (not shown) through the speech lines $L_1$ and $L_2$. $L_3$ and $L_4$ denote the control lines. The button telephone set 53 performs the transmission and reception of a control signal with the main unit through the control lines $L_3$ and $L_4$. $F_1$ and $F_2$ denote speech lines to connect the facsimile apparatus 14 with the button telephone set 53. Reference numeral 1 denotes the CPU to control the whole button telephone set 53; 100 indicates a memory; 2 is a keyboard for inputting such as dial keys, line wire key, line switching key 22, etc.; 3 is an LED group having two-color LEDs 21 to display the line wire state, line switching state, etc. in red or green; 4 is a liquid crystal display (LCD); 5 a control signal transmission/reception circuit to transmit/receive a control signal; T a pulse transformer; and 6 a power source circuit to which an electric power source is supplied from the main unit through the control lines $L_3$ and $L_4$. Reference numeral 7 denotes a speech circuit; 8 is a handset; 9 an A relay to drive a contact point a to switch the speech lines $L_1$ and $L_2$; 10 a constant current circuit to supply a speech current to the speech lines $F_1$ and $F_2$; 11 an IR transmission circuit to transmit a call signal to the speech lines $F_1$ and $F_2$; 12 a ring trip detection circuit to monitor the loop in the call signal transmission; 13 a loop detection circuit to monitor the loop of the speech lines $F_1$ and $F_2$; and HS the hook switch.

Figure 3:
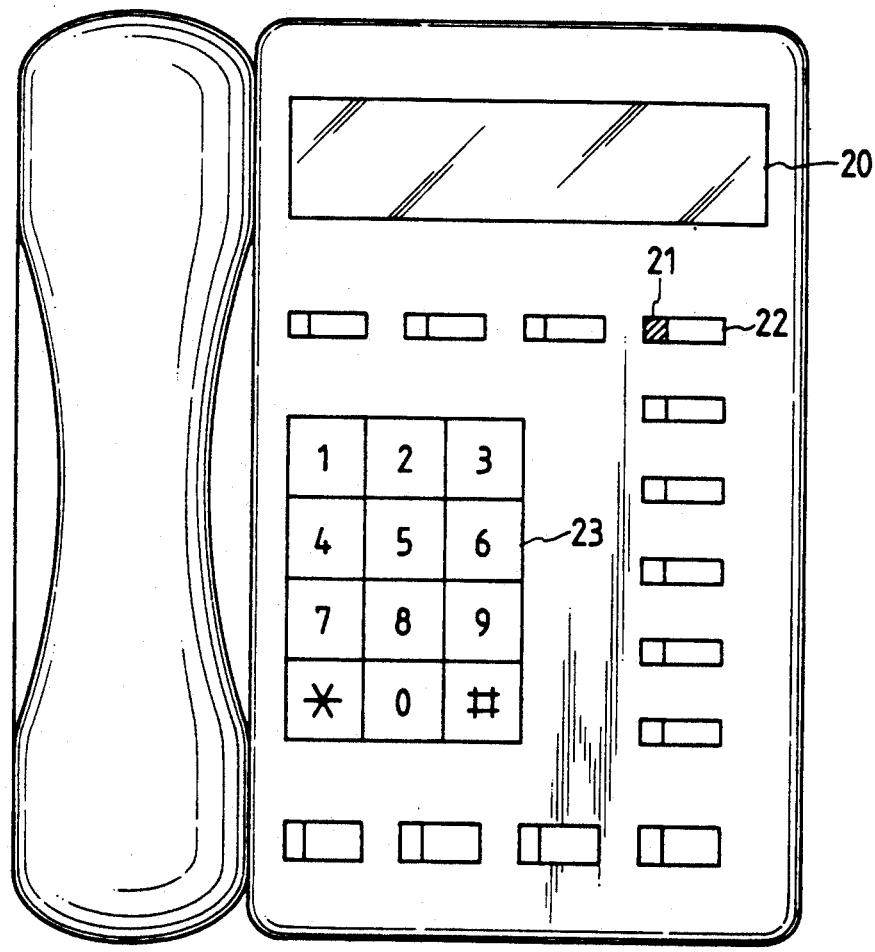
FIG. 3 is an operation panel diagram of the button telephone set.

FIG. 3 is an operation panel diagram of the button telephone set according to the invention. In the diagram, reference numeral 20 denotes a liquid crystal display and 21 the two-color LEDs indicative of the switching states of the speech lines $L_1$ and $L_2$. The green LED indicates the state in which the speech lines $L_1$ and $L_2$ are connected to the button telephone set. The red LED represents the state in which they are connected to the facsimile apparatus. Reference numeral 22 denotes the line switching key to manually switch the speech lines $L_1$ and $L_2$ and 23 represents a dial key.

The setting operation to set the button telephone set to the automatic switching mode and the automatic switching operation when a terminating call is received to the button telephone set will now be described with reference to a flowchart of FIG. 4 and FIGS. 2 and 3 also. After the power source was turned on, the CPU 1 discriminates whether the key 22 has been depressed or not (in step 101) and whether the LED 21 has been lit or not (in step 104). The lighting state of the LED 21 is set in the memory 100. By reference to the memory 100, the CPU1 discriminates the lighting state of the LED 21 and controls the light on/off operation of the LED 21. Further, CPU 1 updates the lighting state of the LED 21 set in the memory 100 in accordance with the state of the line switching key 22 and the state of the hook switch HS. That is, when the key 22 has been input, the processing routine advances to step 102 and the CPU 1 checks the hooking state by the hook switch HS. In the case of the on-hook state, step 103 follows. When the LED 21 is turned off, the red LED is lit and when the LED 21 has already been lit, the LED 21 is off (in step 103). In the next step 104, a check is made to see if the LED 21 has been lit or not. If it is off, the processing routine is returned to step 101 and the apparatus waits unit the key 22 is input. If the LED 21 has been lit, step 105 follows and the apparatus waits for a calling instruction (predetermined instruction to the ordinary button telephone set) from the control lines $L_3$ and $L_4$. When no calling instruction is given, the processing routine is returned to step 101 and the apparatus again waits for the input of the key 22. That is, when the key 22 is input in the on-hook state, the green LED 21 is lit and the apparatus waits for the calling instruction. This state is the automatic switching setting mode. When the key 22 is again input in the on-hook state, the LED 21 is turned off and the automatic switching setting mode is released.

In the automatic switching setting mode, in step 105, when the CPU 1 receives the calling instruction from the main unit through the control lines $L_3$ and $L_4$, pulse transformer T, and control signal transmission/reception circuit 5, the processing routine advances to step 106. By controlling the IR transmission circuit 11 and constant current circuit 10, a call signal (16 Hz, 75 VRAM) is transmitted to the facsimile apparatus 14 through the speech lines $F_1$ and $F_2$. The call signal is sent to the speech lines $F_1$ and $F_2$ at an interval of transmission for one second and rest for two seconds. The facsimile apparatus 14 receives the call signal a preset number of times (e.g., twice) and generates a call sound by a speaker (not shown), then the line is captured. If a call signal of 1300 Hz which is used as a call signal from the facsimile communication network is used as a call signal, when the facsimile apparatus 14 receives the call signal, facsimile apparatus immediately captures the line without generating the call sound from the speaker.

When the ring trip detection circuit 12 detects a ring trip (line capture), the CPU 1 stops the transmission of the call signal. Then, the A relay 9 and contact point a are driven, the speech lines $L_1$ and $L_2$ and connected with the speech lines $F_1$ and $F_2$, the line is switched, and the speech lines $L_1$ and $L_2$ are switched to the facsimile apparatus side. The red LED 21 is lit.

In the next step 107, on the basis of the loop detection circuit 13, the CPU 1 waits that the facsimile apparatus 14 executes a predetermined communication with a distant side facsimile apparatus and the loop of the speech lines $F_1$ and $F_2$ is opened after completion of the communication. When the opening of the loop is detected, step 108 follows. In step 108, the actuation of the A relay 9 is stopped, the contact point a is returned to the initial state, the speech lines $L_1$ and $L_2$ are connected to the hook switch HS, the speech lines are switched to the button telephone set side, the green LED 21 is lit, and the operating mode is reset to the automatic switching setting mode.

That is, after the automatic switching mode was set, the operations in steps 105 to 108 are executed. The CPU 1 automatically switches the speech lines $L_1$ and $L_2$ to the facsimile apparatus side and to the button telephone set side.

The case of manually switching the speech lines will now be described with reference to FIGS. 4, 2 and 3.

Figure 4:
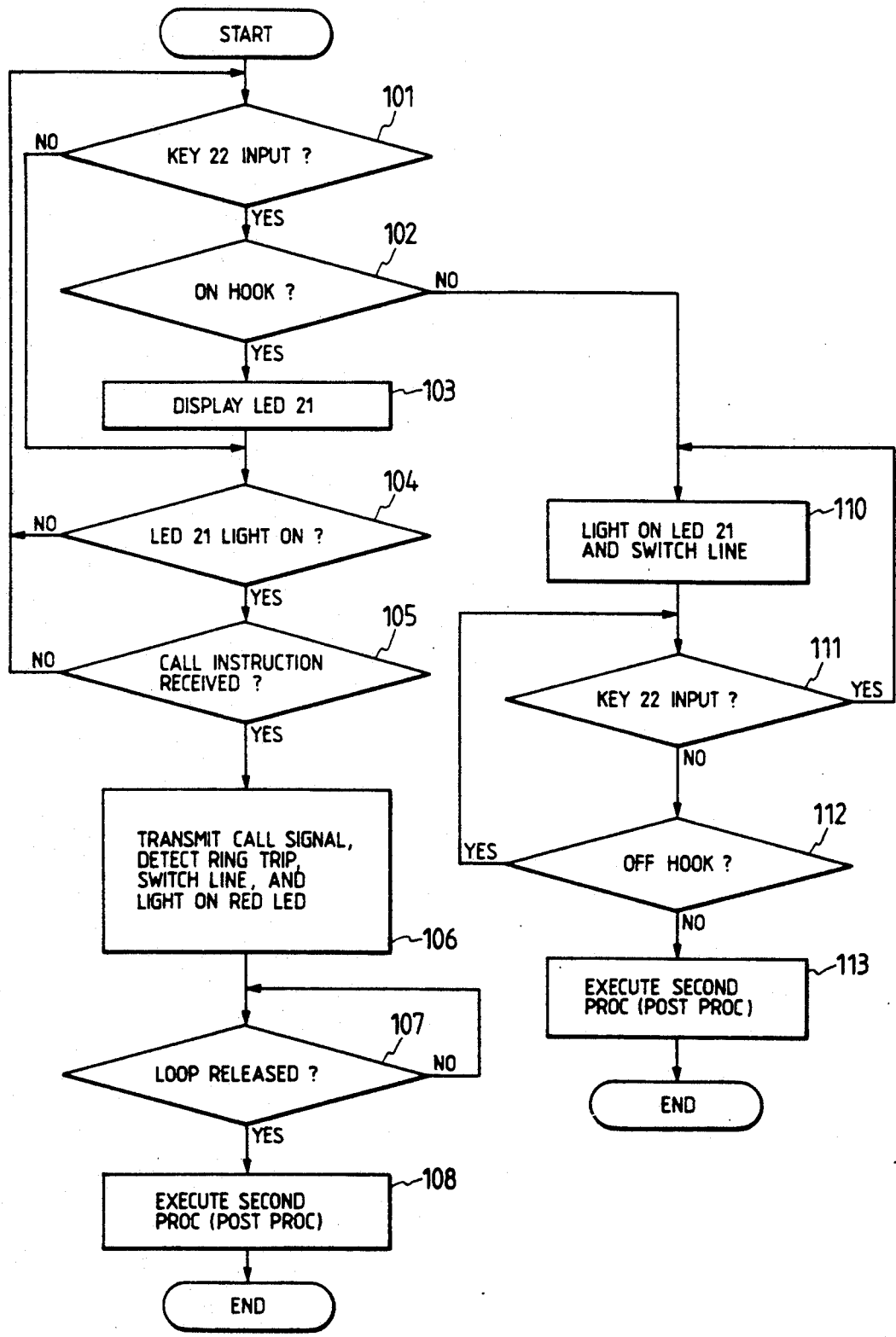
FIG. 4 is a flowchart showing the operation of the embodiment.

In FIG. 4, when the on-hook state is detected in step 102 after the key 22 has been input in step 101, the processing routine advances to step 110 and the CPU 1 checks the lighting state of the LED 21. If the LED 21 is off, the green LED 21 is lit and step 111 follows. When the green LED 21 has been lit, the red LED 21 is then lit and the A relay 9 is driven and the speech lines $L_1$ and $L_2$ are switched to the speech lines $F_1$ and $F_2$ by the contact point a. Thereafter, step 111 follows. When the red LED 21 has been lit, the green LED 21 is lit and the actuation of the A relay 9 is stopped and the speech lines $L_1$ and $L_2$ are switched to the hook switch HS side by the contact point a and, thereafter, step 111 follows and a check is made to see if the key 22 has been input or not. When the input of the key 22 is detected, the processing routine is returned to step 110 and the line is switched. On the contrary, if the key 22 is not input, step 112 follows and a check is made to see if the hook switch HS has been set to the on-hook state or off-hook state. In the off-hook state, the processing routine is returned to step 111 and the apparatus waits for the key input. In the on-hook state, step 113 follows and the LED 21 is turned off, the A relay 9 is made inoperative, the speech lines $L_1$ and $L_2$ are connected to the hook switch HS, and the apparatus is returned to the initial state.

That is, each time the key 22 is manually operated in the off-hook state, the line is alternately connected to the button telephone set side and the facsimile apparatus side. Further, by on-hooking the handset 8, the apparatus is returned to the initial state.

The manual switching operation in the case where a terminating call is received to the button telephone set will now be described.

If the automatic switching mode is not set, when the CPU 1 receives the calling instruction from the main unit through the control lines $L_3$ and $L_4$, the CPU 1 rings a bell (not shown). The operator off-hooks the handset 8. Thus, the CPU 1 detects the off-hook of the handset 8 by the hook switch HS and lights the green LED 21. On the other hand, the operator can make a speech with a call originating person by the handset 8 through the speech lines $L_1$ and $L_2$ and speech circuit 7.

At this time, if the originating call side is a facsimile apparatus, a beep sound is sent from the speech lines $L_1$ and $L_2$. When the operator of the button telephone set 53 recognizes that the originating call side is the facsimile apparatus on the basis of the beep sound from the handset 8, he depresses the key 22. These processes correspond to steps 101 and 102 in the flowchart of FIG. 4. That is, when the CPU 1 detects the input of the key 22, if the handset 8 is determined to be in the off-hook state, step 110 follows.

In this case, since the green LED 21 has been lit, the CPU 1 lights the red LED 21 in step 110 as mentioned above. Further, the IR transmission circuit 11 and constant current circuit 10 are controlled and the call signal is transmitted to the facsimile apparatus 14 through the speech lines $F_1$ and $F_2$. When the CPU 1 detects that the facsimile apparatus 14 captured the line by the ring trip detection circuit 12, the call signal is stopped. The speech lines $L_1$ and $L_2$ are connected to the speech lines $F_1$ and $F_2$ by the A relay 9, thereby switching the line. Thereafter, the facsimile apparatus on the originating call side and the facsimile apparatus 14 connected to the button telephone set 53 execute the communicating procedure. This case corresponds to the manual switching to the facsimile apparatus 14 of the button telephone set 53.

Even if the off-hook state has been detected in step 112, when the CPU 1 detects that the loop with the facsimile apparatus 14 has been formed by the loop detection circuit 13, the processing routine does not advance to step 113. When the loop detection circuit 13 detects the opening of the loop after the facsimile apparatus 14 finished the communication with a distant side facsimile apparatus, the CPU 1 executes the process in step 113.

As described above, according to the embodiment, by providing the A relay 9 and contact point a to switch the speech lines $L_1$ and $L_2$ to the facsimile terminal for the button telephone set, the facsimile terminal can be connected to the button telephone set without depending on the main unit and a predetermined communication can be executed. Further, it is possible to provide an excellent button telephone set in which by providing a switching key, the operator can set the automatic switching mode and can perform the manual switching of the speech lines at an arbitrary time point.

That is, when the handset is in the off-hook state, the automatic switching setting mode can be set by the switching key 22. In this mode, the speech lines $L_1$ and $L_2$ can be automatically switched to the facsimile apparatus 14 in response to a calling instruction from the main unit. Further, in the off-hook state, the speech lines can be manually switched to the facsimile apparatus 14 or button telephone set by the operator at an arbitrary time point by using the switching key 22. Moreover, the green or red LED can be lit in accordance with the line switching state.

The case where the facsimile apparatus 14 requests the connection with the speech lines $F_1$ and $F_2$ will now be described by using FIGS. 2 and 3.

In the diagram, the CPU 1 detects the request for connection from the facsimile apparatus 14 by the loop detection circuit 13 and drives the A relay 9, thereby connecting the speech lines $F_1$ and $F_2$ with the speech lines $L_1$ and $L_2$ by the contact point a. At the same time, the red LED 21 is lit and the off-hook information is informed to the main unit through the control lines $L_3$ and $L_4$. Next, the loop is monitored by the loop detection circuit 13 until a predetermined communication of the facsimile apparatus 14 is finished. When the end of the communication is detected, the the connection of the speech lines $L_1$ and $L_2$ is returned to the initial state by the A relay 9 and contact point a and the on-hook information is also informed to the main unit through the control lines $L_3$ and $L_4$.

The operation from the originating call to the end of the communication by the facsimile apparatus 14 will now be described further in detail with reference to a flowchart of FIG. 6 and a block diagram of FIG. 5.

Figure 5:
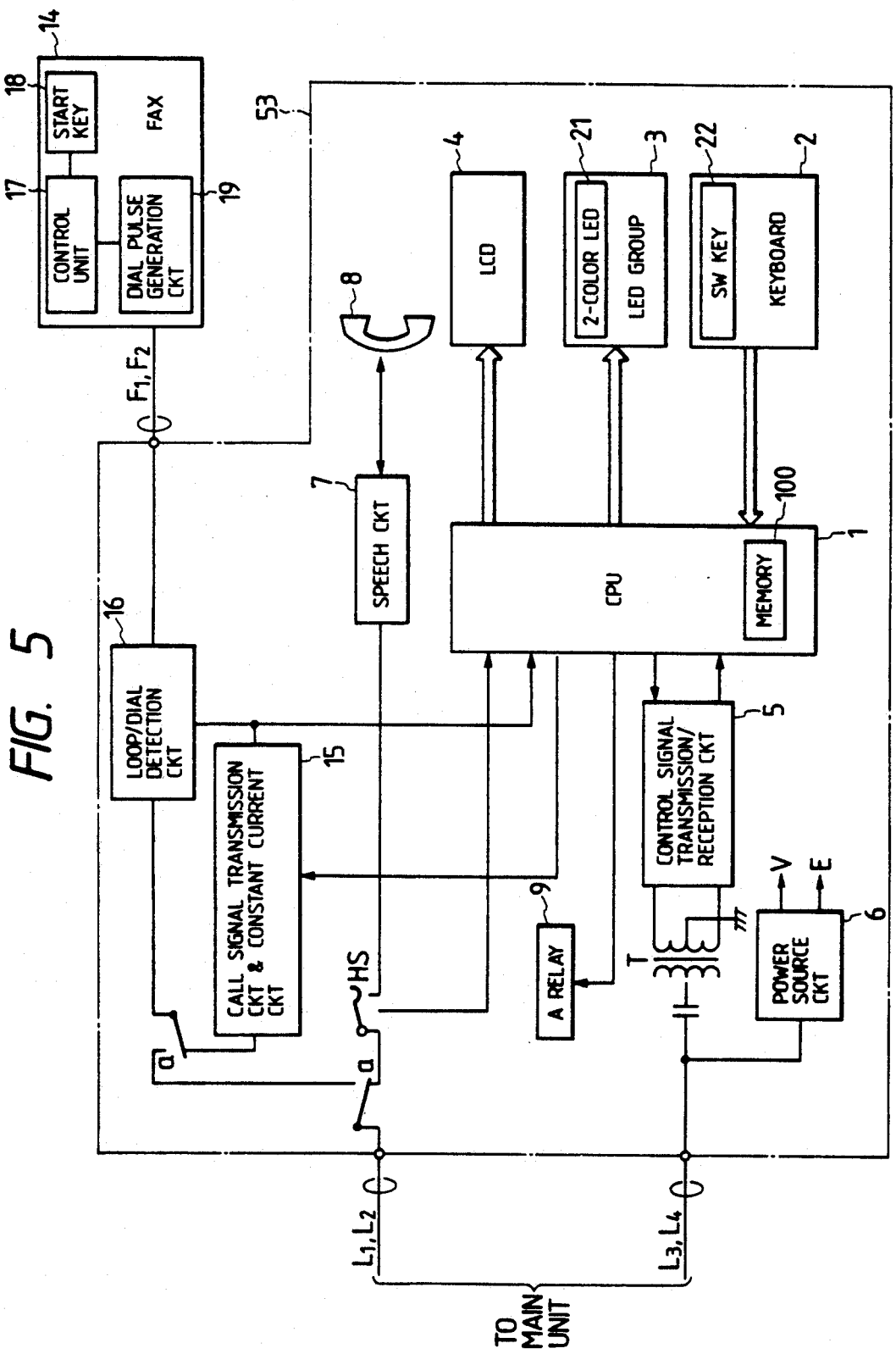
FIG. 5 is a block diagram of the main section of the button telephone set according to the invention.
Figure 6:
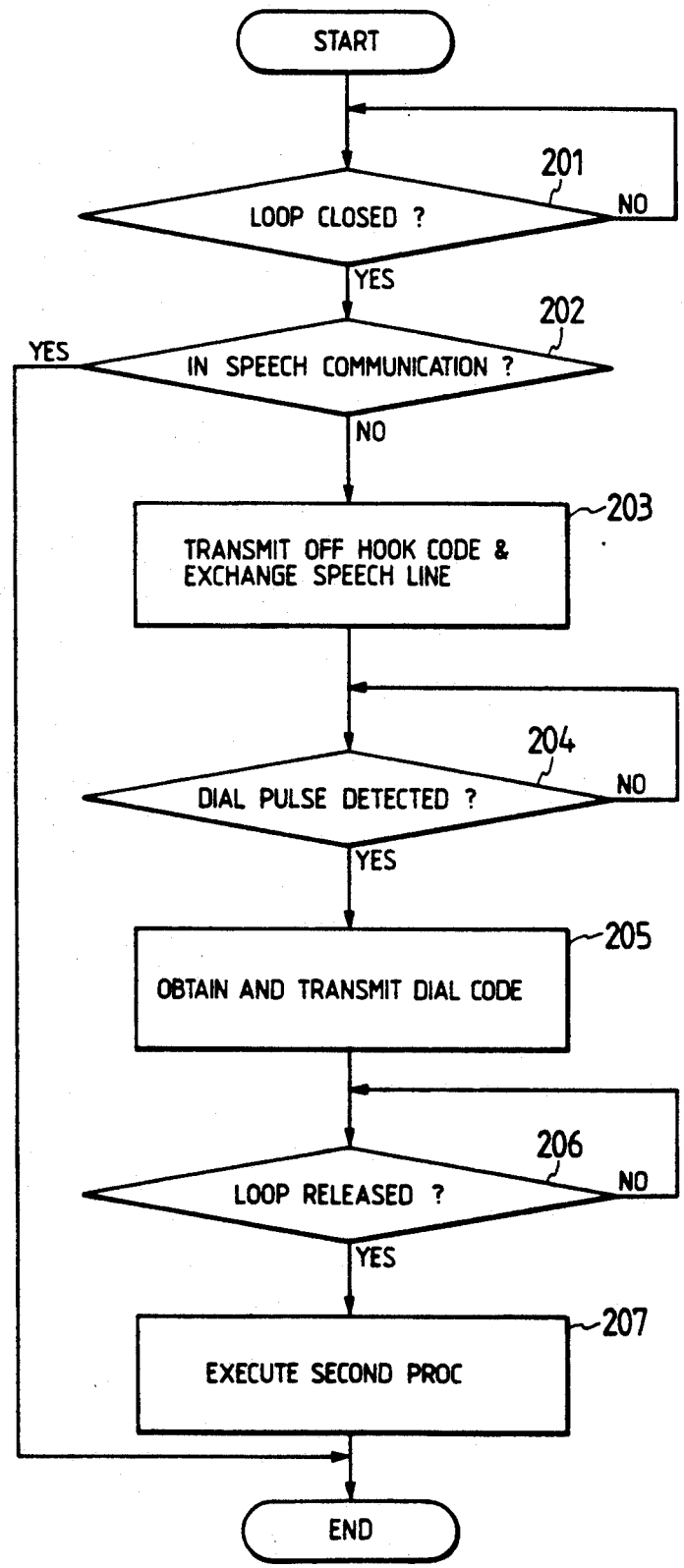
FIG. 6 is a flowchart showing the operation of a CPU when an originating call is transmitted from a facsimile apparatus in the embodiment.

In the block diagram of FIG. 5, reference numeral 15 denotes a constant current circuit to supply a speech current to the speech lines $F_1$ and $F_2$ and a call signal transmission circuit to transmit a call signal of 16 Hz and 75 V. Reference numeral 16 denotes a loop/dial detection circuit to monitor the loop of the speech lines $F_1$ and $F_2$ and to detect dial pulses; 17 indicates a control unit of the facsimile apparatus; 18 a start key to instruct the start of transmission of image data; and 19 a dial pulse generation circuit to generate dial pulses to specify the transmission side.

When detecting the depression of the start key 18, the control unit 17 of the facsimile apparatus 14 closes the loop of the speech lines $F_1$ and $F_2$. When the loop is closed through the speech lines $F_1$ and $F_2$ by the facsimile apparatus 14, the CPU 1 detects the closure of the loop by the loop/dial detection circuit 11 in step 201. Then step 202 follows.

In step 202, when the off-hook is detected by the hook switch HS, the CPU 1 executes the process in step 203 without responding to the transmission request from the facsimile apparatus 14. On the other hand, when the CPU 1 receives the calling instruction from the control lines $L_3$ and $L_4$ and rings a bell (not shown), the CPU 1 also executes the process in step 203 without responding to the transmission request from the facsimile apparatus 14.

In step 203, the CPU 1 transmits predetermined code data of one byte as off-hook data to the speech lines $L_3$ and $L_4$ through the control signal transmission/reception circuit 5 and transformer T and also drives the A relay 9, thereby connecting the speech lines $L_1$ and $L_2$ with the speech lines $F_1$ and $F_2$ by switching the contact point a. On the other hand, when the main unit (not shown) receives the off-hook data from the control lines $L_3$ and $L_4$, the main unit transmits a dial tone of 400 Hz by means of tone sender 57 to the speech lines $L_1$ and $L_2$.

Next, the CPU 1 performs the process in step 204 and waits for the detection of the dial pulses from the dial pulse generation circuit 19. When the dial pulses from the speech lines $F_1$ and $F_2$ are detected by the loop/dial detection circuit 11, step 205 follows. By referring to a table which has previously been registered in the memory 100, the code data (for instance, when two dial pulses are detected, the same code data "32H" code as the dial key 2) of one byte corresponding to the code data of the dial key of the keyboard 2 is obtained in accordance with the number of dial pulses detected. This code data is transmitted to the control lines $L_3$ and $L_4$ through the control signal transmission/reception circuit 5 and transformer T. The similar operations are repeated every time the dial pulses are detected. That is, the number of dial pulses from the facsimile apparatus 14 is converted into the same code data as the number of the dial key of the button telephone set, and then the obtained code is transmitted to the main unit through the control lines $L_3$ and $L_4$.

The main unit generates dial pulses on the basis of the code data received through the control lines $L_3$ and $L_4$ and sends an originating call to the line wire. When the facsimile apparatus on the communication distant side to which the originating call was sent from the main unit responds, the facsimile apparatus 14 executes a predetermined communication to the distant side facsimile apparatus through the speech lines $L_1$, $L_2$, $F_1$ and $F_2$.

After completion of the communication, the loop of the speech lines $F_1$ and $F_2$ is opened. When the CPU 1 detects the opening of the loop by the loop/dial detection circuit 16 in step 206, step 207 follows. The speech lines $L_1$ and $L_2$ are disconnected from the speech lines $F_1$ and $F_2$ by the A relay 9 and contact point a and the connecting state is returned to the initial state. The on-hook data is informed to the main unit through the control lines $L_3$ and $L_4$.

According to the foregoing embodiment, the speech lines are automatically switched and connected by the activation from the facsimile apparatus and the dial signal can be converted into the dial code data. The facsimile apparatus is enclosed to the extension of the button telephone system and the facsimile communication can be performed.

As described above, according to the embodiment, the dial pulse detecting means, means for converting the dial signal into the code data and transmitting, and automatic switching means for automatically switching and connecting the speech lines are provided for the button telephone set 53. Thus, it is possible to provide an excellent button telephone set in which another existing terminal is connected to the button telephone set and a predetermined communication can be executed.

Although the invention has been described above with respect to a preferred embodiment, the invention is not limited to the construction of the embodiment. Various many modifications and variations are possible within the spirit and scope of the appended claims of the invention.

I claim:

1. A communication system comprising:
   a control unit for controlling said communication system; and
   a communicating apparatus which is connected to said control unit via a control channel and a communication channel, and to which another terminal can be connected,
   wherein said communicating apparatus further comprises:
   a handset,
   switch means for connecting a selected one of said handset and said another terminal to said communication channel,
   a switch key for instructing a switching of said switch means,
   receiving means for receiving a calling instruction from said control unit via said control channel, and
   control means for controlling said switch means, in a case where said handset is connected to said communication channel by said switch means, such that said another terminal is connected to said communication channel when said switch key is operated by an operator.

2. A system according to claim 1, wherein said another terminal is a facsimile apparatus.

3. A system according to claim 1, wherein said communicating apparatus receives a control signal from said control via said control channel.

4. A system according to claim 3, wherein said communication apparatus operates in accordance with the received control signal.

5. A system according to claim 1, wherein said communicating apparatus is connected to said control apparatus via two kinds of lines, one being a control line for said control channel and the other being a communication line for said communication channel.

6. A system according to claim 1, wherein said communicating apparatus further comprises setting means for setting an automatic switching mode, and
   in a state where the automatic switching mode is preset, said control means controls, upon reception of a control signal from said control unit via said control channel, said switch means to connect said another terminal to said communication channel.

7. A system according to claim 1, wherein a plurality of communicating apparatuses are connected to said control unit and said another terminal is connected to at least one of said plurality of communicating apparatuses.

8. A system according to claim 7, wherein said control unit has memory means for storing to which one of said plurality of communicating apparatuses said another terminal is connected.

9. A system according to claim 8, wherein each of said plurality of communicating apparatuses has transfer request means for requesting a transfer to said communicating apparatus to which said another terminal is connected, and said control mean has calling instruction output means for outputting a calling instruction to said communicating apparatus to which said another terminal is connected in accordance with said memory means when said transfer request is detected.

10. A system according to claim 1, wherein said control means includes a main unit.

11. A system according to claim 1, wherein said control means switches a connection between an external line and said communication channel.

12. A system according to claim 1, wherein said communication apparatus has a first mode to call said another terminal at a reception time and a second mode not to call said another terminal at the reception time, and said control means switches, in a case where said handset is connected to second modes when said switch key is operated by the operator.

13. A system according to claim 12, wherein said control means controls said switch means such that said another terminal is connected to said communication channel, wherein said another terminal responds to the call.

14. A system according to claim 1, wherein said communicating apparatus has a first mode to connect said another terminal to said communicating channel by said switch means according to a command from said control channel and a second mode not to connect said another terminal to said communication channel, and said control means switches, in a case where said handset is connected to said communication channel by said switch means, said first and second modes when said switch key is operated by the operator.

15. A system according to claim 1, wherein said control means further comprises call means for calling said another terminal, and detection means for detecting a response of said another terminal to a call by said call means, and said control means controls said switch means such that said another terminal is called by said call means when said switch key is operated by the operator, and said another terminal is connected to said communication channel when the response of said another terminal is detected by said detection means.

16. A system according to claim 15, wherein said call means sends a call signal of 16 Hz 75V.

17. A system according to claim 15, wherein said detection means detects a loop formation of said another terminal.

18. A communication system comprising:
a main unit;
a communicating apparatus which is connected to said main unit, and to which another terminal can be connected; and
tone sending means for sending a predetermined tone to said another terminal in accordance with a communication request by said another terminal, wherein said communicating apparatus further comprises, detecting means for detecting information to specify a distant side to be communicated with, the information being generated by said another terminal after sending of said predetermined tone, and code sending means for sending a code corresponding to the detected information to said main unit, wherein said main unit calls the distant side according to the code sent by said code sending means.

19. A system according to claim 18, wherein said code sending means has memory means for storing a table to convert the result of the detection of said detecting means, and said code sending means converts the result of the detection on the basis of a content stored in said memory means.

20. A system according to claim 18, wherein said another terminal closes a loop as a communication request.

21. A system according to claim 20, wherein said communicating apparatus connects said main unit to said another terminal when the communication request is detected.

22. A system according to claim 18, wherein said detecting means detects a dial pulse generated by said another terminal, and said code sending means codes a number of the dial pulses detected by said detecting means.

23. A system according to claim 22, wherein said communicating apparatus further comprises a dial key, sand a code representing the number of the detected dial pulses is common to that representing the corresponding number of said dial key.

24. A system according to claim 23, wherein, when said detecting means detects two dial pulses, said code sensing means generates dial-key code of "2".

25. A system according to claim 18, wherein said communicating apparatus is connected to said main unit via a control line and a communication line, and said code sending means sends the code via said control line.

26. A system according to claim 25, wherein said communicating apparatus further comprises switch means for connecting said main unit to said another terminal via said communication line.

27. A system according to claim 25, wherein said main unit comprises said tone sending means and sends the predetermined tone to said another terminal via said communication line.

28. A system according to claim 18, wherein said another terminal is a facsimile apparatus.

29. A system according to claim 18, wherein said communicating apparatus includes a key telephone set.

30. A system according to claim 18, wherein said main unit generates a call to an external line on the basis of the code received by said communicating apparatus.

31. A system according to claim 18, wherein said main unit comprises said tone sending means and sends the predetermined tone to said another terminal via said communicating apparatus.

32. A system according to claim 18, wherein said predetermined tone is a dial tone of 400 Hz.

33. A system according to claim 18, wherein said detecting means further detects the communication request of said another terminal.

34. A system according to claim 33, wherein said code sending means sends the code corresponding to the detected communication request, and said main unit sends the predetermined tone to said another terminal in accordance with said code.

35. A system according to claim 18, wherein a plurality of communicating apparatuses are connected to said main unit and said another terminal is connected to at least one of said plurality of communicating apparatuses.

36. A system according to claim 18, wherein said communication request is an off hook.

37. A telephone apparatus comprising:
connecting means for connecting a selected one of a handset and another terminal to a communication channel;
calling means for calling the another terminal; and
setting means for setting a call mode if the handset is on-hook when a predetermined key is operated, said call mode calling the another terminal by said calling means at a call reception time,
wherein, if the handset is off-hook when the predetermined key is operated, said setting means sets a state of said connecting means such that the another terminal is connected to the communication channel.

38. An apparatus according to claim 37, wherein said setting means controls said calling means such that said calling means calls the another terminal at the call reception time.

39. An apparatus according to claim 37, wherein said calling means sends a calling signal of 16 Hz at 75V to the another terminal.

40. An apparatus according to claim 37, wherein said connecting means connects the another terminal and the communication channel if the another terminal called by said calling means responds to the call.

41. An apparatus according to claim 37, wherein said setting means receives a reception code via a control channel.

42. An apparatus according to claim 41, wherein the communication channel is provided on a line different from a line on which the control channel is provided.

43. An apparatus according to claim 37, wherein said connecting means connects a facsimile apparatus as the another terminal.

44. A communicating apparatus which is used with connection to a control apparatus via a control channel and a communication channel, and to which another terminal can be connected, comprising:
a handset for a speech communication;
switch means for connecting a selected one of said handset and said another terminal to said communication channel;
a switch key for instructing a switching of said switch means;
receiving means for receiving a calling instruction from said control apparatus via control channel; and;
control means for controlling said switch means, in a case where said handset is connected to said communication channel by said switch means, such that said another terminal is connected to said communication channel when said switch key is operated by an operator.

45. An apparatus according to claim 44, wherein said communicating apparatus has a first mode to connect said another terminal to said communication channel by said switch means according to a command from said control channel and a second mode not to connect said another terminal to said communication channel, and said control means switches, in a case where said handset is connected to said communication channel by said switch mean, said first and second modes when said switch key is operated by the operator.

46. An apparatus according to claim 44, wherein said communicating apparatus operates in accordance with a control signal received from said control apparatus via said control channel.

47. An apparatus according to claim 49, wherein said communicating apparatus has a first mode to call said another terminal at a reception time and a second mode not to call said another terminal at the reception time, and
said control means switches, in a case where said handset is connected to said communication channel by said switch means, said first and second modes when said switch key is operated by the operator.

48. An apparatus according to claim 47, wherein said control means controls said switch means such that said another terminal is connected to said communication channel, when said another terminal responds to a call.

49. An apparatus according to claim 44, wherein said communicating apparatus is connected with a facsimile apparatus as said another terminal.

50. An apparatus according to claim 44, wherein said communicating apparatus is connected to said control apparatus via two kinds of lines, one being a control line for said control channel and the other being a communication line for said communication channel.

51. An apparatus according to claim 44, wherein said communicating means is connected to a main unit as a control apparatus.

52. An apparatus according to claim 44, wherein said control means further comprises call means for calling said another terminal, and detection means for detecting a response of said another terminal to a call by said call means, and
said control means controls said switch means such that said another terminal is called by said call means when said switch key is operated by the operator, and said another terminal is connected to said communication channel when the response of said another terminal is detected by said detection means.

53. An apparatus according to claim 52, wherein said call means send a call signal of 16 Hz 75V.

54. An apparatus according to claim 52, wherein said detection means detects a loop formation of said another terminal.

55. A communicating apparatus which is used with connection to a control apparatus via a control channel and a communication channel, and to which another terminal can be connected, comprising:
receiving means for receiving a control signal including a calling instruction from said control apparatus via said control channel;
a handset;
switch means for connecting either said handset or said another terminal to said communication channel;
control means for switching said switch means on the basis of said receiving means; and
a switch key for instructing a switching of said switch means,
wherein said control means controls said switch means, in a case where said handset is connected to said communication channel by said switch means, such that said another terminal is connected to said communication channel when said switch key is operated by an operator.

56. An apparatus according to claim 55, wherein said control means further comprises call means for calling said another terminal, and detection means for detecting a response of said another terminal to a call by said call means, and said control means controls said switch means such that said another terminal is called by said call means when said switch key is operated by the operator, and said another terminal is connected to said communication channel when the response of said another terminal is detected by said detection means.

57. An apparatus according to claim 56, wherein said call means sends a call signal of 16 Hz 75V.

58. An apparatus according to claim 56, wherein said detection means detects a loop formation of said another terminal.

59. An apparatus according to claim 55, wherein said control means has a first mode to connect by said switch means said another terminal with said communication channel on the basis of said receiving means and a second mode not to connect said another terminal with said communication channel, and said control means switches, in a case where said handset is connected to said communication channel by said switch means, said first and second modes when said switch key is operated by the operator.

60. An apparatus according to claim 55, wherein said communicating means is connected with a facsimile apparatus as said another terminal.

61. An apparatus according to claim 55, wherein said communicating apparatus is connected to said control apparatus via two kinds of lines, one being a control line for said control channel and the other being a communication line for said communication channel.

62. An apparatus according to claim 55, wherein said control means calls said another terminal on the basis of the control signal received by said receiving means, and when said another terminal responds to a call said control means controls said switch means such that said another terminal is connected to said communication channel.

63. An apparatus according to claim 55, wherein said communicating means is connected to a main unit as a control apparatus.

64. An apparatus according to claim 55, wherein, when said receiving means receives a calling instruction, said control means switches said switch means.

65. An apparatus according to claim 64, further comprising setting means for setting an automatic switching mode, and wherein, under a condition where said automatic switching mode is preset, said control means switches said switch means when said receiving means receives the calling instruction.

66. A communicating apparatus which is used with connection to a main unit, and to which another terminal can be connected, comprising:

a terminal for sending a predetermined tone to said another terminal in accordance with a communication request from said another terminal;

detecting means for detecting information to specify a distant side to be communicated, the information being generated by said another terminal after sending of said predetermined tone;

sending means for sending to said main unit a code corresponding to the detected information.

67. An apparatus according to claim 66, wherein said communication request is an off hook.

68. An apparatus according to claim 66, wherein said communicating apparatus is connected to said main unit via a control line and a communication line, and said sending means sends the code via said control line.

69. An apparatus according to claim 68, wherein said communicating apparatus further comprises switch means for connecting said main unit to said another terminal via said communication line.

70. An apparatus according to claim 69, wherein said switch means connects said another terminal via said terminal.

71. An apparatus according to claim 68, wherein said terminal sends to said another terminal the predetermined tone from said communication line.

72. An apparatus according to claim 66, wherein said terminal sends to said another terminal the predetermined tone generated by said main unit.

73. An apparatus according to claim 66, wherein said communicating apparatus includes a key telephone set.

74. An apparatus according to claim 66, wherein said predetermined tone is a dial tone of 400 Hz.

75. An apparatus according to claim 66, wherein said communicating means is connected with a facsimile apparatus as said another terminal.

76. An apparatus according to claim 66, wherein said detecting means detects the information via said terminal.

77. An apparatus according to claim 66, wherein said detecting means detects a dial pulse generated by said another terminal, and said sending means codes a number of the dial pulses detected by said detecting means.

78. An apparatus according to claim 77, wherein said communicating apparatus further comprises a dial key, and a code representing the number of the detected dial pulses is common to that representing the corresponding number of said dial key.

79. An apparatus according to claim 78, wherein, when said detecting means detects two dial pulses, said sending means generates a dial-key code of "2".

* * * * *

UNITED STATES PATENT AND TRADEMARK OFFICE
CERTIFICATE OF CORRECTION

PATENT NO. : 5,222,126
DATED : June 22, 1993
INVENTOR(S) : TSUTOMU NISHINO

It is certified that error appears in the above-identified patent and that said Letters Patent is hereby corrected as shown below:

COLUMN 3

Line 7, "switching key 22" should read --switching key 21--.

COLUMN 10

Line 47, "munication" should read --municating--.

COLUMN 11

Line 8, "mean" should read --means--.
Line 25, "to second" should read --to said communication channel by said switch means, said first and second--.
Line 34, "communicating" should read --communication--.

COLUMN 12

Line 31, "sand" should read --and--.
Line 36, "sensing" should read --sending--.

COLUMN 14

Line 3, "mean," should read --means,--.
Line 10, "claim 49," should read --claim 44,--.
Line 48, "send" should read --sends--.

UNITED STATES PATENT AND TRADEMARK OFFICE
CERTIFICATE OF CORRECTION

PATENT NO. : 5,222,126
DATED : June 22, 1993
INVENTOR(S) : TSUTOMU NISHINO

It is certified that error appears in the above-identified patent and that said Letters Patent is hereby corrected as shown below:

<u>COLUMN 16</u>

Line 12, "tone;" should read --tone; and--.

Signed and Sealed this

Fourteenth Day of June, 1994

Attest:

BRUCE LEHMAN

Attesting Officer    Commissioner of Patents and Trademarks